US00RE39234E

(19) United States
(12) Reissued Patent
Ostendorf et al.

(10) Patent Number: US RE39,234 E
(45) Date of Reissued Patent: Aug. 8, 2006

(54) VENDING MACHINE AUDIT MONITORING SYSTEM

(75) Inventors: Eugene G. Ostendorf, Timonium, MD (US); John C. Cowles, Downingtown, PA (US); Irwin D. Morris, Bel Air, MD (US); Gerald W. Smith, Clayton, NJ (US)

(73) Assignee: Audit Systems Company, Hunt Valley, MD (US)

(21) Appl. No.: 10/180,997

(22) Filed: Jun. 26, 2002

Related U.S. Patent Documents

Reissue of:
(64) Patent No.: 5,442,568
Issued: Aug. 15, 1995
Appl. No.: 08/341,875
Filed: Nov. 15, 1994

(51) Int. Cl.
*G06F 17/00* (2006.01)

(52) U.S. Cl. ..... 700/241; 700/232; 700/236; 700/237; 700/238; 700/244; 221/129

(58) Field of Classification Search ..... 700/230–238, 700/241, 244; 221/7, 9, 14, 21, 129; 340/825.35; 194/206
See application file for complete search history.

(56) References Cited

U.S. PATENT DOCUMENTS 4,216,461 A * 8/1980 Werth et al. ..... 340/5.9
4,369,442 A * 1/1983 Werth et al. ..... 377/7
4,498,570 A * 2/1985 King et al. ..... 194/217
4,598,378 A * 7/1986 Giacomo ..... 700/236
5,029,098 A * 7/1991 Levasseur ..... 705/10
5,036,966 A * 8/1991 Kaspar et al. ..... 194/217
5,113,351 A * 5/1992 Bostic ..... 700/236
5,205,436 A * 4/1993 Savage ..... 221/7
5,299,113 A * 3/1994 England et al. ..... 700/17

* cited by examiner

*Primary Examiner*—Gene O. Crawford
*Assistant Examiner*—Jeffrey Shapiro
(74) *Attorney, Agent, or Firm*—Rosenberg, Klein & Lee

(57) ABSTRACT

An audit monitoring system (10) is provided for use with any of a multiplicity of different coin operated vending machines (300). The audit monitoring system includes an interface assembly (102) for use in replacing an existing data link (330) within vending machine (300). The interface assembly (102) is coupled to an audit monitoring assembly (100) which interprets the communications signals transferred between a controller (310), coin changer (322) and bill validator (324) of vending machine (300). Audit monitoring assembly (100) is powered from a power supply (302) of vending machine (300) and includes interface circuitry (110,120,130) for receipt of digital logic level signals, serial data or relay logic signals from vending machine (300). Additionally, the data retrieval terminal (20) may be removably coupled to the audit monitoring assembly (100) through either a hard wired coupling (254) through a serial interface (250) or alternately by means of infrared optical signals (12, 22) through an infrared interface circuit (260).

19 Claims, 6 Drawing Sheets

VENDING MACHINE AUDIT MONITORING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention directs itself to audit monitoring systems for use with coin operated vending machines. In particular, this invention directs itself to an audit monitoring system having an interface assembly for retrofit coupling with existing vending systems of various types and manufacture. Still further, this invention directs itself to an audit monitoring system having a microprocessor controlled audit monitoring assembly coupled to an interface assembly, both being installed in an existing coin operated vending system for monitoring control signals between the vending machine's controller and its funds receiving and dispensing equipment. More in particular, this invention pertains to a microprocessor controlled audit monitoring system wherein predetermined parameters utilized for interpreting transaction data for the coin operated vending machine is output from the system's memory responsive to an identification code input thereto. Further, this invention directs itself to an audit monitoring system utilizing a clock/counter implemented within the microprocessor for such functions as timing power failures and door openings.

2. Prior Art

Audit monitoring systems are well known in the art. The best prior art known to the Applicants include U.S. Pat. Nos. 5,205,436; 5,113,351; 5,036,966; 4,369,442; and, 4,216,461.

In prior art systems such as that disclosed by U.S. Pat. Nos. 4,369,442 and 4,216,461, microprocessor controlled audit systems are incorporated in vending machines for temporarily storing transaction data of the machine and subsequently outputting such to a data collection terminal. However, such systems are adapted for interface with one particular type of machine of a single manufacturer. Such systems do not provide any means for retrofit application to existing coin operated vending systems. Further, such systems do not provide any means for utilizing identification codes for signifying a particular type of machine, and utilizing appropriate signal interpreting parameters in conjunction with such codes.

In other prior art systems, such as that disclosed by U.S. Pat. No. 5,036,966, coin validation equipment is provided for retrofit into newspaper vending racks. Such systems have the capability of recording the time and day of sale, and subsequently transferring such data by an optical communications link to a data retrieval device. However, such systems do not provide for retrofit to a multiplicity of different types of machines, made by different manufacturers. Nor, do such systems include any means for interface with a vending machine's controller and coin accepting devices.

In still other prior art systems, such as that disclosed by U.S. Pat. Nos. 5,205,436 and 5,113,351, vending systems coupled to remote processors are provided. Such remote processors are capable of monitoring the transactions of the vending systems. providing usage and inventory data to the vending system operator. However, such systems are designed to operate with a particular type of vending system from a particular manufacturer. Such audit systems are incorporated into the vending equipment at the time of manufacture, and am not capable of retrofit into any of a plurality of existing vending machines.

SUMMARY OF THE INVENTION

An audit monitoring system for use with a coin operated vending system is provided. The audit monitoring system includes an interface assembly coupled to a data link between the vending machine's controller and its funds receiving and dispensing equipment, for monitoring communication therebetween. The audit monitoring system further includes a microprocessor coupled to an output of the interface assembly for (1) interpreting the monitored communications responsive to predetermined parameters, and (2) discriminating and accumulating transaction data for the coin operated vending system. Coupled to the microprocessor, there is provided a memory array for (1) storing the predetermined parameters, (2) outputting the predetermined parameters to the microprocessor responsive to an identification code input to the memory array, and (3) storing the transaction data. A power supply coupled to the interface assembly, microprocessor and memory array is provided for supplying an operating voltage thereto. The audit monitoring system also includes an input/output assembly removably coupled to the microprocessor for input of the identification code to the microprocessor and output of the transaction data therefrom.

DESCRIPTION OF THE PREFERRED EMBODIMENT

Referring to the Figures, them is shown, a vending machine audit monitoring system 10 for retrofit into any of a wide variety existing vending machines 300. As will be seen in following paragraphs, vending machine audit monitoring system 10 is specifically directed to the concept of providing a means of adding an audit monitoring capability to previously manufactured coin operated vending machines of various types which otherwise had none. Although not restricted to retrofit applications, vending machine audit monitoring system 10 is particularly adapted to interface with a large variety of different types of coin operated vending machines, adding an audit capability thereto. In addition to being capable of interfacing with a multitude of machine types, vending machine audit monitoring system 10 also provides the capability for interfacing with different types of data retrieval terminals, communicating through either a hard wire or infrared data link, each having a different protocol.

Figure 1:
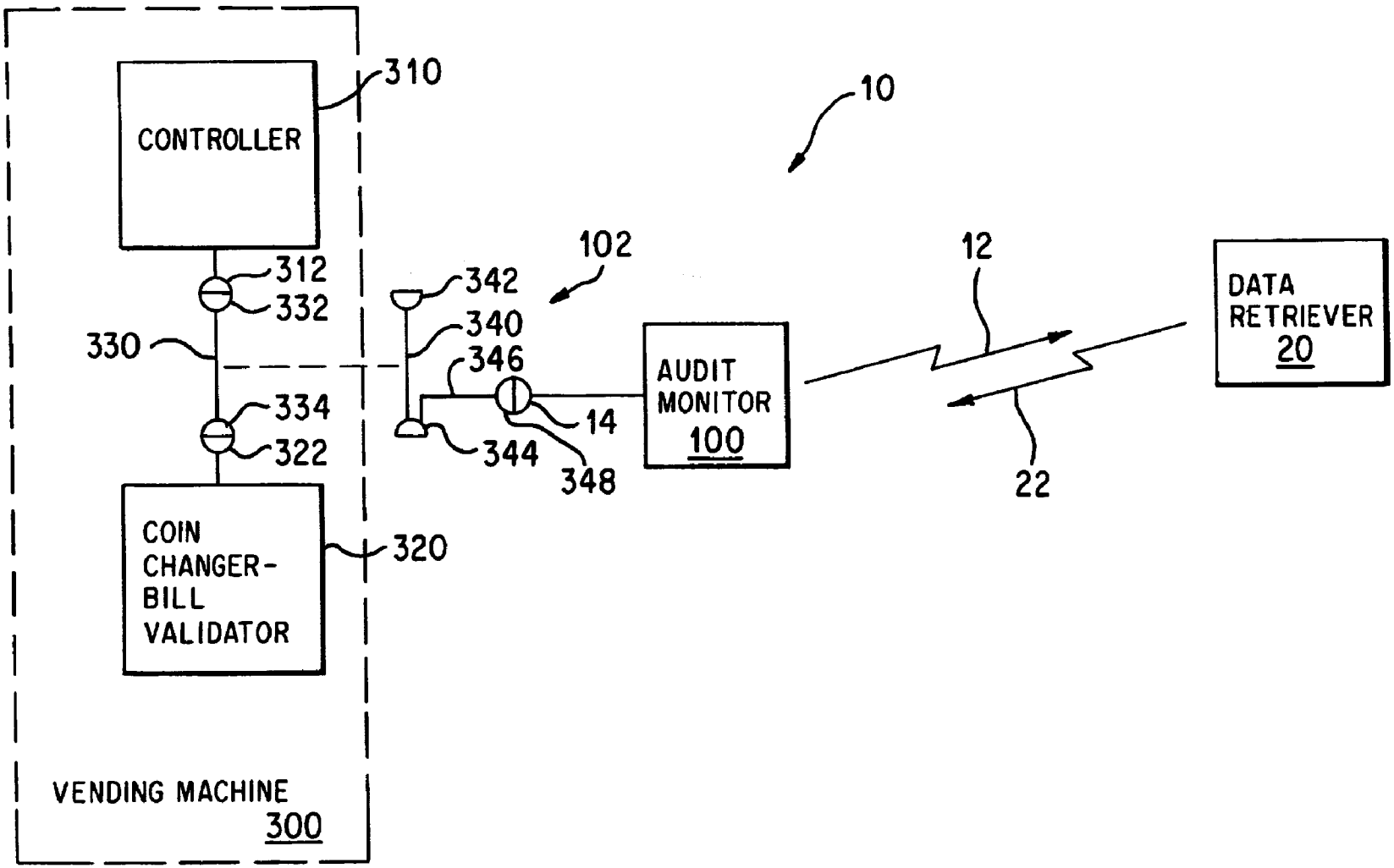
FIG. 1 is an overall block diagram for audit monitoring system 10 illustrating its retrofit interface with a vending machine 300.

Referring now to FIG. 1, there is shown, a conventional vending machine 300 of the type including therein a coin changer-bill validator assembly 320 for receiving and dispensing funds coupled to a controller 310 by a data link 330.

Data link 330 may be formed by a plurality of conductors for providing bi-directional serial communications, a parallel data bus, or a combination thereof. As is typical of such vending machines, vending machine 300 is of a modular construction wherein the controller 310 includes a connector 312 for coupling to a complementary connector 332 of data link 330. Similarly, coin changer-bill validator assembly 320 includes a connector 322 for coupling with the complementary connector 334 of data link 330. Vending machine 300 may be any one of a plurality of different types of vending machines. Such different types of vending machines 300 may include those that provide one or more selectable items, each vended at the same price, or be of a more complex variety having a multiplicity of different produces available to vend, wherein each type is each priced differently, or each type belongs to one of a plurality of different price groups. This latter type of machine is commonly referred to as a multi-price machine, and the former is referred to as a single price machine.

To further complicate the variety of vending machine 300 which may be encountered, it should be noted that the coded signals utilized to transmit data between the controller 310 and the equipment utilized for receiving and dispensing funds, as represented by the coin changer-bill validator 320 assembly, may differ from one manufacturer of vending machine 300 to another. Bill validators may also differ between machines of the same general type (multi vs. single price) from the same manufacturer, thereby creating many sub-categories. Thus, there has heretofore not been a single audit system capable of interfacing with other than a single and narrow class of vending machine, and that class from only a particular manufacturer.

Vending machine audit monitoring system 10 includes an interface assembly 102 which is coupled to the vending machine data link connectors for monitoring and carrying communications between the funds receiving and dispensing equipment 320 and the vending machine controller 310. The interface assembly 102 includes the appropriate conductive pathways 340 coupled on opposing ends to connectors 342 and 344 for replacing the connections made by connectors 332 and 334, respectively. The conductive pathways in the link 340 are either tapped or daisy-chained through an interface cable 346 which is terminated in a respective connector 348 for coupling with a complementary connector 14 of the audit monitor assembly 100. It is therefore only necessary that the data link 330 be removed from the vending machine 300 and replaced by the interface assembly 102, coupling the controller connector 312 to the connector 342 and the coin changer-bill validator connector 322 to the interface connector 344.

The audit monitor assembly 100 is secured within the housing of vending machine 300 and subsequently initialized utilizing the data retriever 20. Data retriever 20 is a hand-held terminal-type device which communicates with the audit monitor assembly 100. Data retriever 20 may be of a type that receives infrared signals 12 from the audit monitor assembly 100 and similarly transmits infrared signals 22 thereto. Alternately, the hand held terminal may be of the type where the data link is formed utilizing a removable hard wire connection. Obviously, the data retriever may take the form of a personal computer, lap-top, palm or pocket size computer, or a modem for coupling with a remote data processor without affecting the inventive concept of system 10. The initialization procedure includes the transmission of a code representing the type of machine being monitored. The audit monitoring assembly 100 utilizes this code for identifying predetermined parameters previously stored in memory and utilizing such in interpreting the monitored communications between the units 310 and 320.

As will be discussed in following paragraphs, subsequent to initialization, the audit monitor assembly 100 is adapted to discriminate between vending operations for items of different monetary values and accumulate a total number of operations for each of the different monetary values, as well as a total of all of the vending operations. Additionally, assembly 100 tracks how many bills are located in particular portions of the bill validator and the number of coins, and their value, which are in various portions of the coin changer, as well as the number and value of coins which have been paid out. The audit monitor assembly 100 is also capable of tracking the number of times the interior of the vending machine 300 has been accessed, as well as the time and date associated therewith, the time and date of power outages, and the time and date of data retrieval by the data retriever terminal 20.

Figure 2:
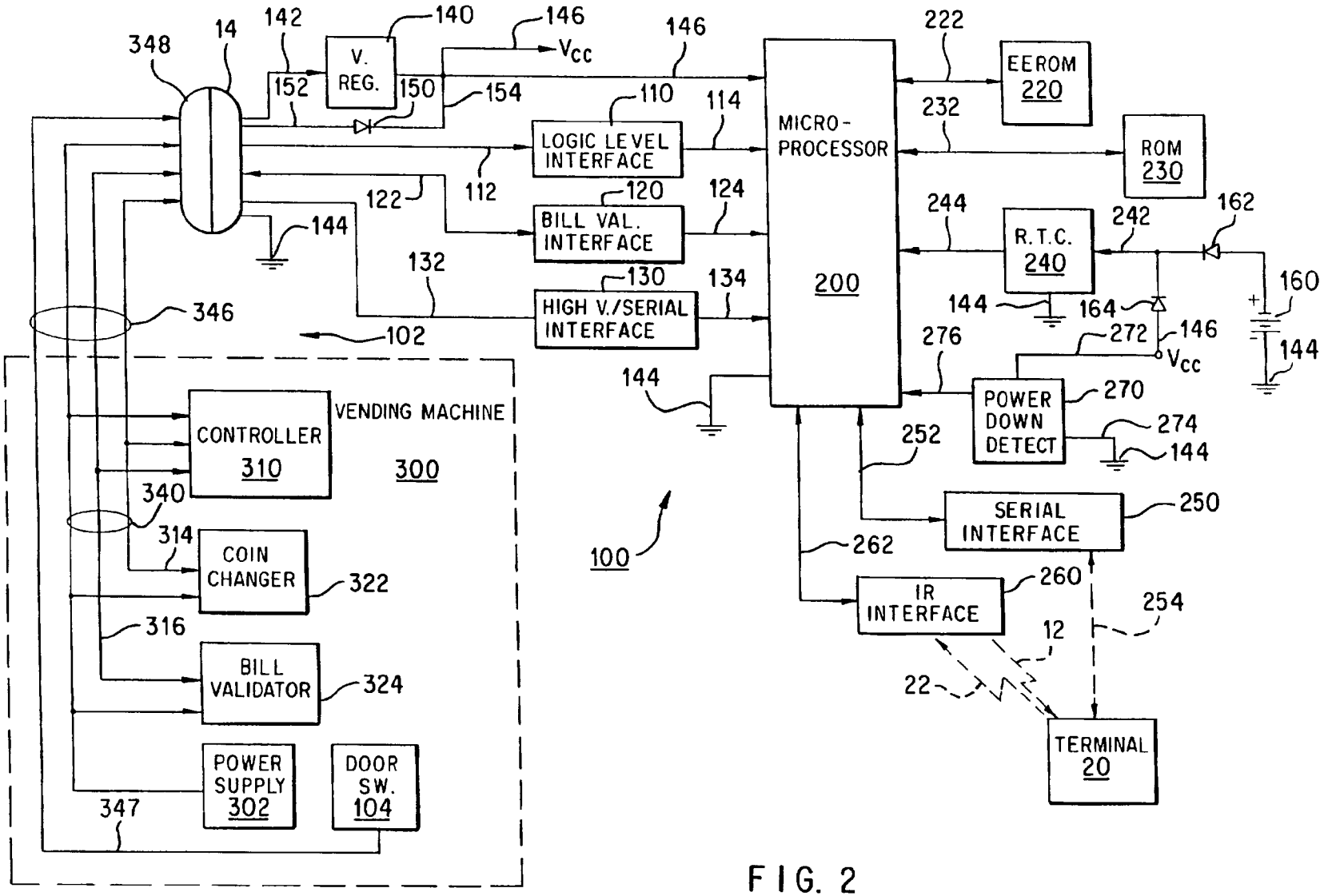
FIG. 2 is a block diagram detailing the circuit elements which form the audit monitoring assembly 100, and their interface with the vending machine 300.

Referring now to FIG. 2, there is shown, a block diagram of the audit monitor assembly 100 and its connection to the subassemblies of the vending machine 300. As previously described, the interface assembly 102 provides the means by which the audit monitoring assembly 100 is coupled to the various components of vending machine 300. In addition to providing the monitored signals to the audit monitor assembly 100, interface assembly 102 also provides the power for operating the circuits of assembly 100 from the power supply 302 of vending machine 300.

Interface 102 provides the necessary conductive pathways 340 to maintain the communications data link between the controller 310 and both the coin changer 322 and bill validator 324, as well as coupling from the power supply 302 to each of those subsystems. As will be seen in following paragraphs, the interface with the vending machine data link may involve more than simple paralleling of the signal pathways to provide monitoring signals to assembly 100. Although it is rare to find vending machines without bill validators, where system 10 is to be incorporated into such a machine, obviously, that connection would be omitted from the interface assembly 102. Where it is desired to accumulate data as to the number of times the interior of the vending machine 300 had been accessed, a door switch 104 is secured to the machine such that its contacts are operated whenever the door of the vending machine is opened. It is not important to the inventive concept as to whether such contact operation is from a normally closed condition to an open condition, or from a normally open condition to a closed condition, and adaptation to the circuits of audit monitor assembly 100 to use either is well within the knowledge of those skilled in the art. A pair of conductors of a cable 347 provide electrical coupling between the door switch 104 and the connector 348, as part of the cable 346 for communicating any contact operation to audit monitor assembly 100.

The source of power for audit monitoring assembly 100 is derived from the power supply 302 of vending machine 300. The voltage supplied by power supply 302 may vary considerably, depending on the type of vending machine 300 which is to be monitored. However, the power supply voltage of a vending machine 300 will typically fall in one of two categories, either an unregulated relatively high voltage in the range of 12–16 volts, or a regulated 5 volt source suitable for use with integrated logic circuits, such as TTL logic. Interface 102 is designed such that an unregulated power supply voltage from vending machine 300 will be coupled to the appropriate pins of connector 14 for coupling the unregulated power source between the ground reference 144 and the input lead 142, through the connector 14. Input lead 142 couples the unregulated voltage to a voltage regulator 140 having an output voltage bus 146 for supplying a regulated 5 volts to all of the active devices which form the assembly 100. Although not shown, it is understood that the supply voltage $V_{CC}$ is coupled to all of the active devices of assembly 100 in a manner similar to that shown for microprocessor 200, such being coupled to the 5 volt bus 146 and the ground reference 144. Alternately, wherein the power supply of vending machine 300 provides the proper regulated voltage, such is coupled through the connector 14 to the input lead 152 for coupling with the DC bus 146 through an isolation diode 150 and the coupling line 154.

Where the controller 310 communicates with the coin changer 322 utilizing logic level signals on the data link 314, such are coupled through the respective connectors 348, 14 to the input bus 112 for coupling to the logic level interface 110. Logic level interface 110 buffers and/or conditions the logic level signals for coupling to microprocessor 200 by way of the coupling line 114. On the other hand, where vending machine 300 is of the type having a controller and coin changer which communicate at high voltage levels (greater than 5 volts) and/or by way of a serial data format, such are coupled through the respective connectors 348, 14 to the input lead 132, for input to the high voltage/serial interface circuit 130. The signals supplied to the input of the interface 130 are appropriately converted to logic level signals suitable for coupling to microprocessor 200 through the coupling line 134. Interface 130 may incorporate optical couplers as a means of achieving both signal isolation and voltage transformation, as is well known in the art. Where vending machine 300 includes a bill validator 324, the communications carried by data link 316 are routed through the connectors 348, 14 to the bill validator interface 120 through the coupling line 122. As will be seen in following paragraphs, bill validator interface 120 couples signals corresponding to those on line 122 input to microprocessor 200 through the coupling line 124, and outputs the appropriate signals to the controller 310 substantially simultaneously.

Figure 3:
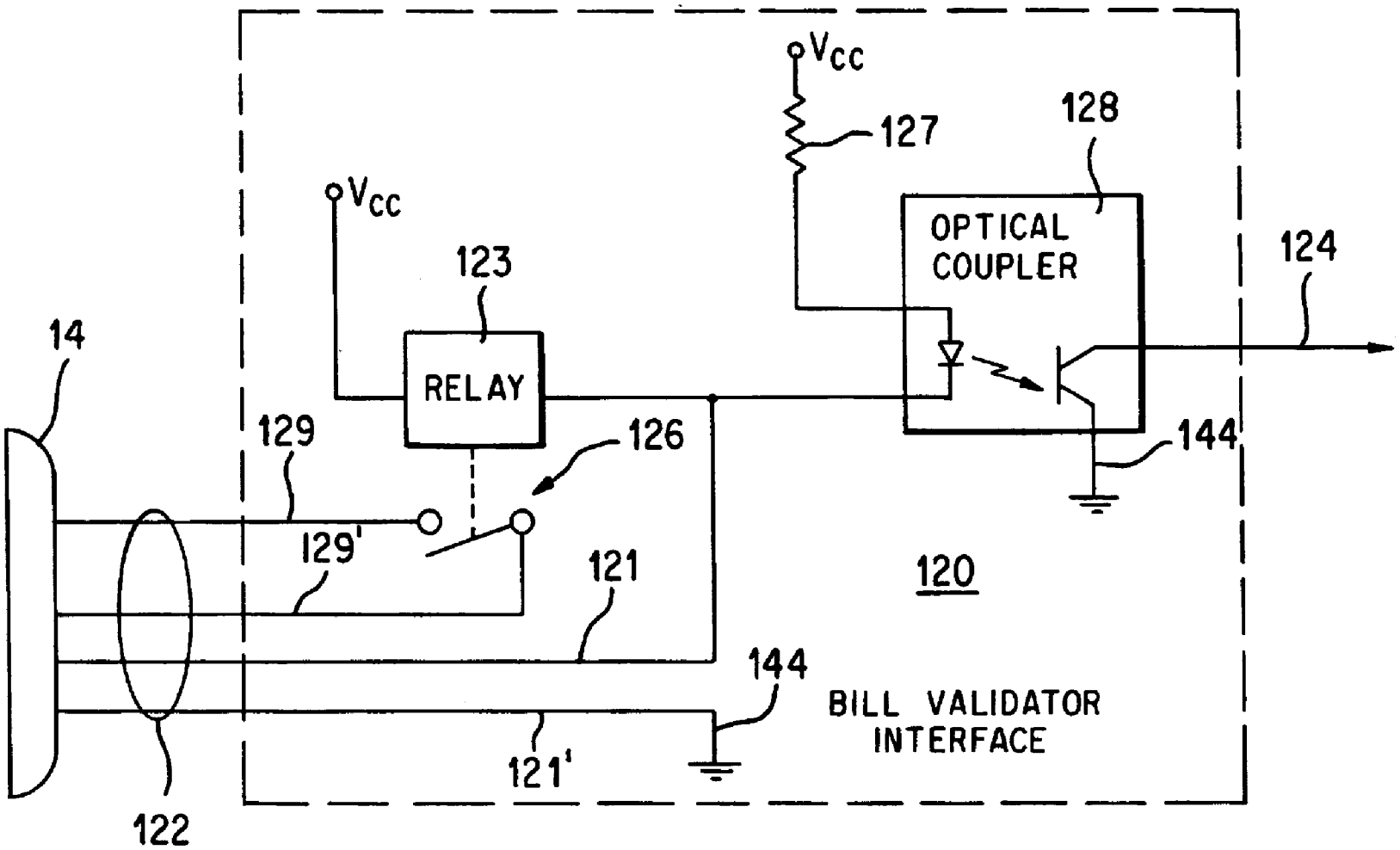
FIG. 3 is a circuit block diagram depicting the bill validator interface circuit block; and, FIGS. 4–6 comprise a flow chart of the upper level software algorithm of the audit monitoring system.

Referring now to FIG. 3, there is shown, a schematic representation of the bill validator interface 120. Responsive to an input signal from the bill validator 324 coupled to line 121, such signal being in the form of relay closures or conduction of active open collector device for applying a momentary ground, from line 121', to line 121. A current then flows from the voltage supply $V_{CC}$ through the current limiting resistor 127 and the input light emitting diode of the optical coupler 128 for generating an equivalent number of optical pulses transmitted within optical coupler 128 to the output photo transistor thereof. Responsive to the optical signal received by the photo transistor portion of optical coupler 128, the signal line 124 is brought down to substantially ground potential for a period of time representative of each pulse input to optical coupler 128. Such impulses are detected at the input of microprocessor 200 and interpreted thereby, as will be described in following paragraphs. Substantially simultaneous with the generation of the signal coupled to output line 124, a relay 123 is energized responsive to each of the negative going pulses input on line 121. The relay contacts 126 thus provide an intermittent contact closure between the leads 129 and 129' which are coupled to the controller 310 of vending machine 300 for simulating the conventional output of bill validator 324 while also providing electrical isolation. Thus, by means of the interface assembly 102, being adapted to appropriately couple the internal signals of vending machine 300 to the connector 14 of the audit monitoring assembly 100, the operations of vending machine 300 can be monitored to collect audit data therefrom.

While the operational signals of vending machine 300 may be easily coupled to audit monitor assembly 100, in the aforesaid manner, to microprocessor 200, the interpretation of those signals is complicated by the fact that the sequence and timing of such signals varies from one manufacturer's vending machine 300 to another and from one manufacturer's type of machine having one type of bill validator to another of the same manufacturer's machine having a different type of bill validator. As a simplified example, one vending machine 300 may use a bill validator 324 having an escrow feature, that is, a received bill that has been determined by the validator to be valid legal tender, is held in an escrow position. From the escrow position it may be returned, if no vending selection is made, or accepted upon the user making his article selection and the machine vending the product. In such case, the validator 322 outputs a, pulse upon initial receipt of a valid bill and a second pulse when the bill is accepted and moved from the escrow position. Whereas, a non-escrowing type of bill validator accepts all valid bills, providing a refund when no vend is made through the coin changer. Thus, for the non-escrowing type of bill validator only a single pulse is output for each potential vend operation, and the coin changer will be signaled if no vend operation is carried out. Still other types of validators are multi-value devices which identify the value of the bill input thereto and signal such by output of a number of pulses representing that value. In such a system, acceptance of a five-dollar bill will be signaled by the output of a pulse train comprising five consecutive pulses. Microprocessor 200 must be able to distinguish between these different signal protocols in order to properly account for the transactions of a particular vending machine 300 to which it has been coupled.

Referring back to the block diagram of FIG. 2, microprocessor 200 is shown coupled to a read only memory 230 by means of the coupling line 232, representing the necessary data, addressing and control signal pathways for bi-directional communication therebetween. Similarly, microprocessor 100 is coupled to an electrically erasable programmable read only memory 220 by means of the coupling line 222. Read only memory 220 may be any programmable type of non-volatile memory, either internal or external to the microprocessor without departing from the inventive concept. Read only memory 230 stores the software which controls the operation of microprocessor 200, as well as the many different parameters which may be required for microprocessor 200 to interpret the signals monitored through the interface assembly 102, as previously discussed. Responsive to the microprocessor's receipt of an identification code during the initialization procedure, performed during the installation of the audit monitoring assembly 100 into the vending machine 300, software flags are set such that the appropriate parameters are transferred from read only memory 230. These parameters may be used in processing input signals as they are read, or transferred to the non-volatile memory 220 for subsequent use in the software routines used by microprocessor roll in interpreting the monitored communications of vending machine 300. It is not important to the inventive concept which method is used, however, it is of particular importance that the many parameters for the different vending machines be stored in assembly 100 and selectively made available responsive to entry of an identification code. All of the audit data and time stamping information is stored in the erasable read only memory 220 for subsequent transfer to a data retrieval terminal 20.

Microprocessor 200 is coupled to a pair of output interface circuits 250, 260 by respective coupling lines 252,262. Interface circuit 250 is a serial interface for bi-directional communications to a retrieval terminal 20. Such communications being through a cable 254 which is removably engageable with an appropriate connector mounted to the housing which encloses the audit monitoring assembly 100 or a cable extending therefrom. The communications carried by the cable 254 may use an industry standard protocol known as the Direct Connect Interface Standard, although microprocessor 100 may be programmed to receive and transmit any desired protocol. Interface 260 is an optical interface for transmitting and receiving signals within the infrared portion of the electromagnetic spectrum. The protocol for data transmitted through this optical interface may also be an industry standard, or one specially tailored to a particular type of terminal 20. Like the identification codes utilized for "personalizing" audit monitoring assembly 100 to a particular vending machine 300, the output interface protocol can be similarly tailored utilizing a code input when the system is initialized, utilizing a default protocol for the initial communications. Alternately, the protocol used for transmission to assembly 100 can be identified by microprocessor 100, and then utilized for transmission of data output thereby.

Microprocessor 200 may also receive an input from the real time clock 240, by means of coupling line 244, which may be included in the system to provide time stamps in association with particular events, and thereby improve the audit capabilities of system 10. Real time clock 240 is powered from voltage supplied to the power supply input lead 242 of real time clock 240, such voltage normally being supplied from the power supply bus 146 through an isolation diode 164. However, real time clock 240 is also coupled to a backup battery 160 through an isolation diode 162. Thus, if power is interrupted to the vending machine 300, the real time clock 740 will remain energized from the battery 160, with the diode 164 preventing flow of current from battery 160 to any other device coupled to the power supply bus 146. Similarly, the diode 162 prevents any flow of current from the power supply bus 146 to the battery 160, which is desirable for applications utilizing lithium cells. However, in cases where nickel cadmium batteries are utilized, the diode 162 may be eliminated or bypassed with a current limiting resistor to providing for charging current to maintain the cells in a fully charged state between power interruptions.

Real time clock 240 provides the capability for identifying a time and date of various operations and transactions of vending machine 300 and assembly 100. Events such as door switch operations, in addition to being simply counted, may be tagged with the time and date of the occurrence, allowing a vending machine owner to identify when the vending machine was accessed to replenish the goods being vended and/or removal of cash therefrom, regardless of whether audit data is retrieved at such time. The time and date may also be stored at the restoration of power, subsequent to a power failure. This power failure data, the frequency of occurrences and their time of day/date, can be utilized in assessing whether power is being deliberately removed in order to bypass the audit function of system 10. This feature is enhanced by incorporation of the power down detection circuit 270. Detection circuit 270 outputs an interrupt to microprocessor 200 on line 276 when the power supply voltage falls below a predetermined threshold value, indicating that a power outage is imminent. Detector circuit 270 is coupled to the $V_{CC}$ supply by line 272 and the ground reference 144 by line 274.

Audit monitoring assembly 100 uniquely utilizes microprocessor 200 to detect a power failure, and in combination with real time clock 240 determines when the power was restored and the length of time that power was out. As will be described in following paragraphs, a clock counter is implemented in the software of microprocessor 200, which may be utilized for timing events in applications not requiring the accuracy of real time clock 240, which would be excluded from assembly 100 in such applications, as could power down detector circuit 270. In the absence of power down detector circuit 270, the internal clock counter and use of two bytes of memory provide a unique means for identifying and timing power failures without the need for additional hardware to identify a low voltage condition.

The internal clock counter is incremented at two minute intervals, with the new accumulated total stored in ROM memory 120 every hour, or any other time increment desired depending on whether memory write cycles are to be limited. Since microprocessor 200 is not provided with any battery backup, its processing stops coincident with a loss of power, and upon power restoration must reinitialize variables, counters and the like. Thus, whenever power is restored, the internal clock counter is reset to the last value that was stored in ROM 220. Power failures are identified by the state of a pair of bytes of memory on reinitialization of microprocessor 200. Part of the initial start-up processing is to store a known bit pattern in each of two bytes of memory. When the system is reinitialized after a power outage, those two bytes will contain random bit patterns, thereby indicating that a power failure had occurred. Responsive to identification of such an abnormal condition, microprocessor 200 increments a power outage count stored in ROM 220, and reads the real time clock 240, if such is present, to identify the time and date of power restoration, and stores such data in non-volatile memory 220. If real time clock 240 is not present,, microprocessor 200 uses the last internal clock counter accumulation which had been stored in non-volatile memory 220 for the power failure time stamp, which represents, on average, the nearest half hour time period prior to the power failure. The difference between that last time period established by the internal clock counter and the time-of-day read from the real time clock 240 establishes the approximate length of time that power was out. Such is more accurately determined where the occurrence of a power failure is identified by the power down detection circuit 270. Obviously, the frequency of power outages, the time that they occur and length of such occurrence provides important security data to the owner of vending machine 300.

Figure 4:
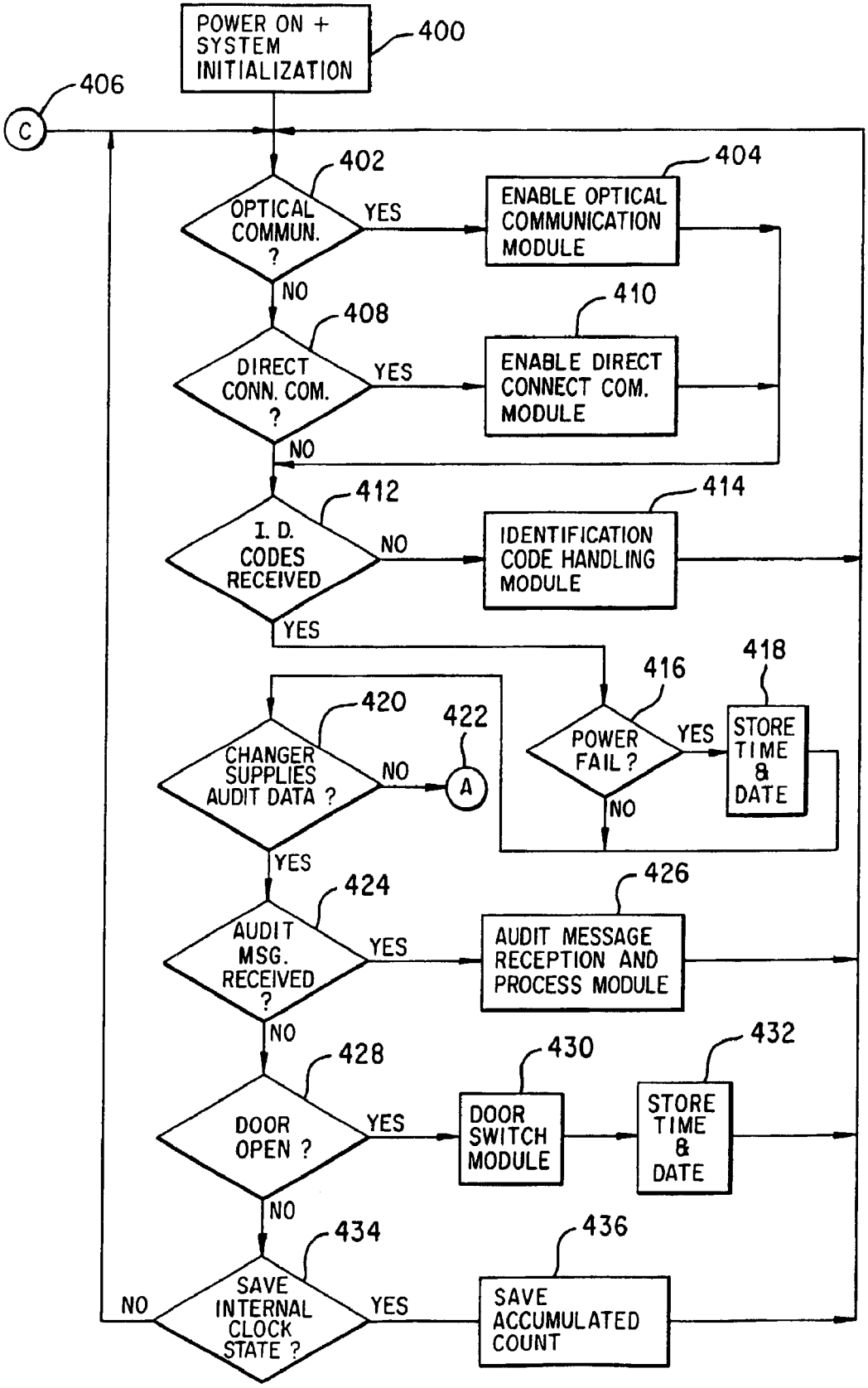
Figure 5:
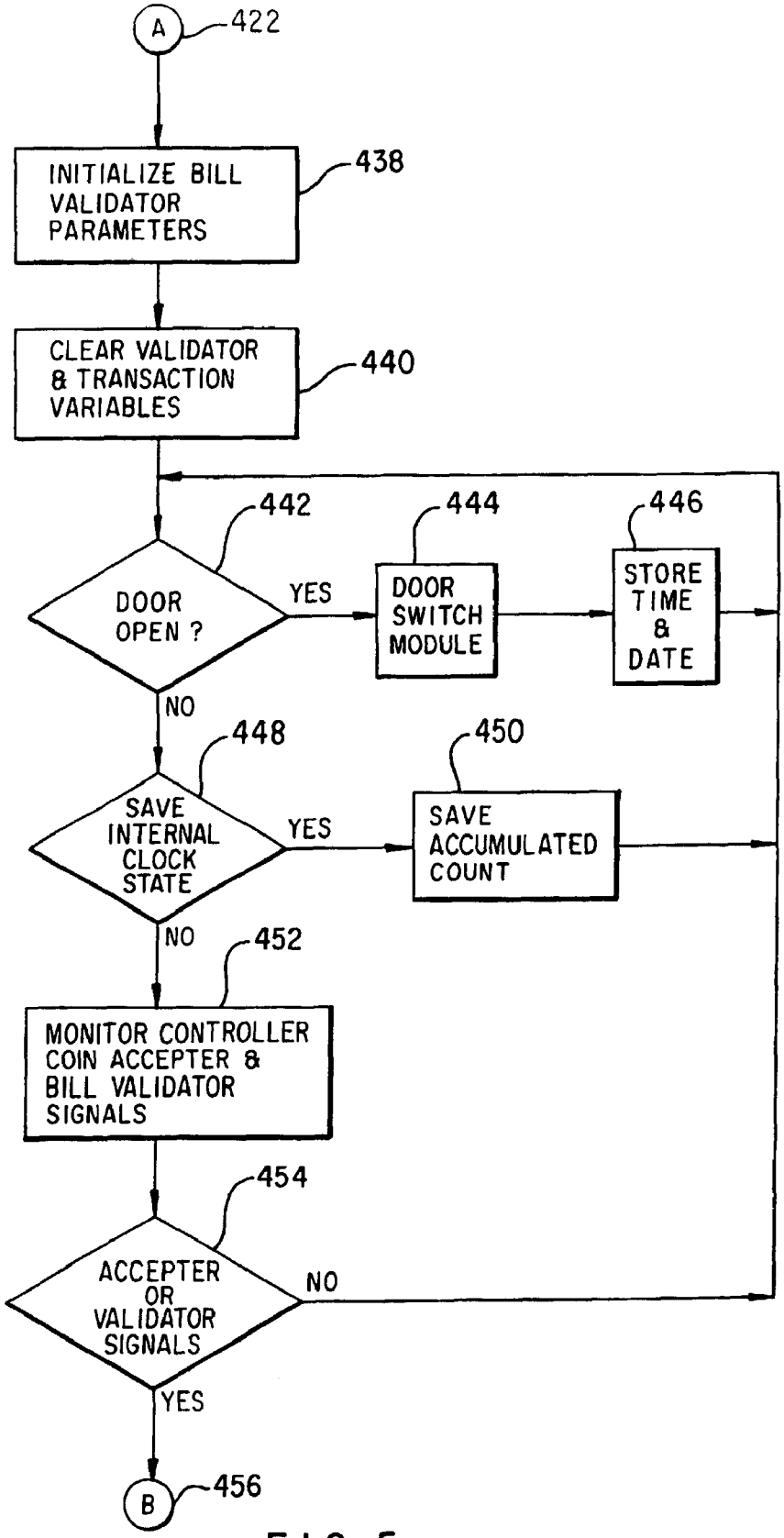
Figure 6:
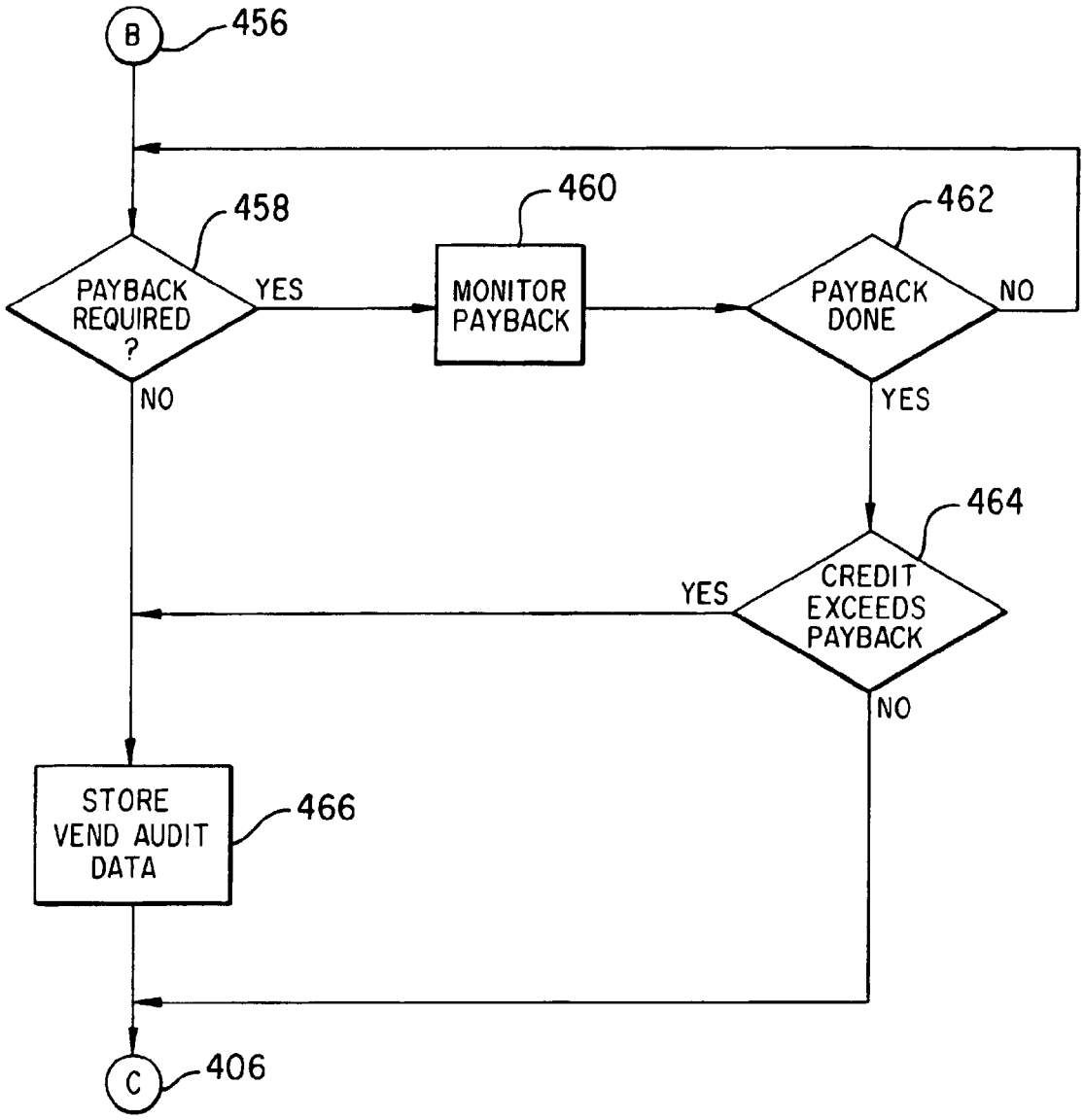

Referring now to the flow charts of FIGS. 4–6, there is shown an outline of the upper level software flow utilized in microprocessor 200. As is typical in microprocessor controlled systems, upon energization, initialization procedures are initiated. As indicated in block 400, such initialization is carried out responsive to energization. The initialization block represents such operations as resetting timers, enabling interrupts and clearing variables. From block 400, the flow passes to the decision block 402, wherein it is determined whether the optical interface has received any communication. If optical communications have been received, the flow passes to block 404, wherein the optical communications module, a separate software sub-routine, is enabled. Subsequent to completion of optical communications, carried out by the sub-routine called from block 404, the flow would pass to decision block 412. If no optical communication had been received, flow passes from decision block 402 to decision block 408, wherein it is determined whether any communication is received through the hardwire serial interface. If such communication has been received, flow passes to block 410, wherein the direct connect communications module is called. Subsequent to completion of any such communications, flow passes from the block 410 to the decision block 412, as does the flow from decision block 408 if no communication was received by the serial interface. Decision block 412 tests whether the identification codes for vending machine 300 have been previously received, and if not, flow passes to' the sub-routine called in block 414. Since the proper interface with vending machine 300 cannot be achieved without the appropriate identification codes being entered, the flow from block 414 passes back to decision block 402 to form a continuous loop until the identification codes have been received. Obviously, an indication (such as a message output to terminal 20) that the code must be entered is provided by the system. Alternately, the system could begin with default or random parameters selected, such being subsequently changed to properly interface with a specific machine.

Once the identification codes for vending machine 300 have been received, or if such had previously been entered, flow passes from decision block 412 to decision block 416. Decision block 416 tests whether a power failure had occurred since the last time through the main processing loop. As was previously described, whether a power failure had occurred or not is determined by the state of the internal clock/counter in combination with the state of audit data retrieval (whether such has just occurred). If a power failure has been identified, the flow passes from decision block 416 to block 418, wherein power failure housekeeping is performed, such as storing the time and date of the power failure, reading the last stored output of the internal clock/counter, and determining the duration of the power outage determined and storing that determination. From block 418 flow passes to decision block 420, as does the flow from decision block 416 if no power failure is detected. In block 420, it is determined from the previously entered I.D. codes whether vending machine 300 is a vending machine where audit data is supplied by the coin changer.

If the vending machine 300 is of the type where the changer supplies audit data, the flow passes to decision block 424, wherein the vending machine interface is tested to determine whether an audit message (communication relative to operations of the vending machine which are accumulated by the audit system) has been received from the vending machine hardware through the interface circuitry of assembly 100. If such audit message was received, flow passes from block 424 to block 426 wherein the sub-routine for handling the audit message and processing the data is called. From block 426 the flow loops back to decision block 402. If no audit message is currently being received, flow passes from block 424 to decision block 428, wherein it is tested whether the vending machine door has been opened, by monitoring the installed door switch, as has previously been described. If the door switch has operated, flow passes to block 430, wherein the door switch sub-routine is called. From block 430, the flow passes to block 432, wherein the time and date from the real time clock is read and stored in the non-volatile memory. From block 432, flow passes back to decision block 402. If the door has not been opened, flow passes to decision an block 434. Decision block 434 tests to determine when the last time the internal clock counter state had been saved. If this time period is less than two minutes, the flow passes from block 434 back to decision block 402. However, if the time period is not less than two minutes, the flow passes from block 434 to block 436, wherein the accumulated count of the internal clock/counter is saved in non-volatile memory. From block 436 the flow passes back to block 402.

If in decision block 420 it is determined that audit data is not provided by the coin changer, the flow passes through connector 422 to the bill validator initialization routine indicated by block 438 of FIG. 5, as the bill validator, coin acceptor and controller must each be monitored to ascertain the audit data. Initialization of the bill validator parameters includes the setting of particular flags in the software for translating the signals which pass between the bill validator 324 and controller 310 of vending machine 300. These parameters are selected responsive to the identification codes entered when the system was first initialized. From block 438, flow passes to block 440 wherein the particular variables utilized for tracking the bill validator operation and vending transactions are cleared. From block 440 flow passes to decision block 442, wherein it is tested whether the vending machine door has begin opened. If the door switch indicates that the vending machine door has been opened, flow passes to block 444 wherein the door switch module is called and the appropriate incrementing of counters is accomplished. From block 444 flow passes to block 446 wherein the time and date is read from the real time clock and such is appropriately stored. From block 446 the flow loops back to decision block 442. If the door has not been opened, or has subsequently been closed, flow passes from block 442 to decision block 448. As in block 434, previously described, block 448 tests to determine whether two minutes has passed since the last time the internal clock counter state had been saved. If the two minute time period has lapsed, then flow passes to block 450 wherein the accumulated count is saved. From block 450, flow loops back to decision block 442. If less than two minutes has elapsed, flow passes from block 448 to block 452. In block 452, the activity of vending machine 300 is monitored, identifying operation of the controller, coin acceptor and bill validator, essentially reading from the interface to determine whether any activity is transpiring.

From block 452, flow passes to block 454, wherein it is tested whether activity between the controller 310 and the coin changer 322 or bill validator 324 has occurred. If no activity has occurred, flow passes from block 454 back to block 442. However, where activity is detected, flow passes from block 454 to block 458 of FIG. 6, through connector 456. In block 458, it is determined whether the controller 310 has indicated that cash be paid back to the customer through the coin changer 322 or bill validator 324 (return the escrowed bill). If such signals had been detected, flow passes from block 458 to block 460. In block 460, the payback activity of the vending machine is monitored, with flow then passing to decision block 462. In block 462 it is tested whether the payback command from the controller 310 has been carried out by the coin changer or bill validator. If such had not yet been carried out, the flow passes back to decision block 458 to form a loop which continues until the payback is complete. Upon completion of the payback, the flow passes from block 462 to decision block 464. In block 464, it is determined whether the customer has received a full refund, or only change from a vending of an item or items. If the customer had received a full refund, flow passes back to block 402 of FIG. 4 through connector 406, since no vend has occurred. However, if the customer received only change, flow passes to block 466. In block 466, the vend audit data, which may comprise the cost of the item, the amount tendered to the machine, and the change dispensed therefrom, are stored. Obviously, the real time clock 240 may be utilized to time and date stamp the purchase if such data were desired. Subsequent to storage of the vend audit data in block 466, flow passes back to block 402 of FIG. 4 through connector 406 to repeat this process.

It can thus be seen, system 10 provides a unique ability to interface with a wide variety of existing vending machines to provide a retrofit audit capability not previously available with a single audit monitoring assembly. Audit monitoring assembly 100 in combination with interface assembly 102 permits adaptability of one system 10 to vending machines from different manufacturers and of different configurations, from the same or different manufacturers. An identification code entered to identify the machine type and configuration is utilized by microprocessor 200 to select the appropriate parameters for decoding the signals received and output by the controller 310 of the vending machine 300. With proper decoding of the signals utilized by the vending machine 300, the audit monitoring assembly 100 can properly store the transactions of the particular machine to which it is connected. Periodically, a data retriever 20 will be coupled to monitoring assembly 100, through either a hard wire or optical interface, to recover the audit data therefrom. The terminal 20 will read the data stored in non-volatile memory 220, through interface with microprocessor 200, and transfer to the microprocessor and time and date of the transaction from the terminal's internal clock. If the nonvolatile memory 220 is to be erased subsequent to reading data therefrom, the transfer of the time and date from the terminal will proceed subsequent to such erasure, and the time and date from the real time clock 240 may also be stored at that time in order to provide a correlation between the terminal's clock and the time-of-day data provided by the real time clock 240. Thus, in combination, the alternative interfaces, both input and output, as well as the use of software to provide adaptive configurability, affords system 10 its unique and novel features which overcome the disadvantages and deficiencies of prior art systems.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An audit monitor for retrofit into a coin operated vending system, the vending system having means for receiving and dispensing funds coupled to a controller by a data link, said audit system comprising:

interface means coupled to the data link for monitoring communication between the funds receiving and dispensing means and the controller, microprocessor means coupled to an output of said interface means for (1) interpreting said monitored communications responsive to parameters selected from a plurality of predetermined parameters, said selected parameters including at least a protocol of said monitored communications and (2) discriminating and accumulating transaction data for the coin operated vending system;

memory means coupled to said microprocessor means for storing said plurality of predetermined parameters and said transaction data, said memory means *being coupled to said microprocessor means by data, addressing and control signal pathways, said memory means* including a circuit for (1) reading a predetermined number of said stored predetermined parameters defining said selected parameters, and (2) providing an output thereof to said microprocessor means responsive to an identification code input to said memory means [therefrom] *from said microprocessor means*;

power supply means coupled to said interface means, said microprocessor means, and said memory means for supplying an operating voltage thereto; and input/output means removably coupled to said microprocessor means for input of said identification code to said microprocessor and output of said transaction data therefrom.

2. The audit monitor as recited in claim 1 where said memory means includes a read only memory for storage of said predetermined parameters.

3. The audit monitor as recited in claim 1 where said microprocessor means includes a first serial interface for providing a wired coupling with said input/output means and a second serial interface for providing an infrared coupling with said input/output means.

4. The audit monitor as recited in claim 1 where said microprocessor means includes means for detecting a failure of said power supply means to supply said operating voltage and means for accumulating a total number of times said failure has been detected.

5. The audit monitor as recited in claim 1 where said interface means includes means for interfacing with a currency validator of the coin operated vending system.

6. The audit monitor as recited in claim 1 where said interface means includes means for monitoring displacement of an access door of the coin operated vending system.

7. The audit monitor as recited in claim 1 where said microprocessor means discriminates between vending operations for items of different monetary values and accumulates a total number of operations for each of said different monetary values and a total of all of said ending operations.

8. The audit monitor as recited in claim 7 where said memory means includes storage locations for said total number of operations for each of said different monetary values and said total of all of said vending operations.

9. The audit monitor as recited in claim 1 where said power supply means includes an input coupled to a D.C. power source of the coin operated vending system.

10. An audit monitoring system for addition to any of plurality of different types of existing coin operated ending systems, at least one of the types of vending systems having a currency validator and a coin changer coupled to a controller by a data link, said audit monitoring system comprising:

adapter means coupled to the currency validator, coin changer and controller of the vending system in place of the data link for accessing signals communicated therebetween;

interface means coupled to said adapter means for buffering said accessed signals;

microprocessor means coupled to an output of said interface means for monitoring said buffered accessed signals to discriminate and accumulate predetermined transaction data therefrom, said microprocessor means including means for interpreting said buffered accessed signals responsive to parameters selected from a plurality of predetermined parameters;

memory means coupled to said microprocessor means for storing said plurality of predetermined parameters and said transaction data, said memory means *being coupled to said microprocessor means by data, addressing and control signal pathways, said memory means* including a circuit for (1) reading a predetermined number of said stored predetermined parameters defining said selected parameters, and (2) providing an output thereof to said microprocessor means responsive to an identification code input to said memory means [therefrom] *from said microprocessor means*;

power supply means coupled to said interface means, said microprocessor means, and said memory means for supplying an operating voltage thereto; and input/output means removably coupled to said microprocessor means for input of identification data to said microprocessor and output of said transaction data therefrom.

11. The audit monitoring system as recited in claim 10 where said memory means includes a read only memory for storing said plurality of predetermined parameters.

12. The audit monitoring system as recited in claim 10 where said microprocessor means includes a first serial interface for providing a wired coupling with said input/output means.

13. The audit monitoring system as recited in claim 12 where said microprocessor means includes a second serial interface for providing an infrared coupling with said input/output means.

14. The audit monitoring system as recited in claim 10 where said microprocessor means includes means for accumulating values for each of a total number of bills accepted by the currency validator, a total number of bills in a stacker of the currency validator, a total number of coins entered into various compartments of the coin changer, a total number and value of coins paid out, a total number of vending operations and a total number of vending operations for each of a plurality of differently priced items, said accumulated values being stored in said memory means and subsequently output to said [input/out put] *input/output* means responsive to a command signal therefrom.

15. The audit monitoring system as recited in claim 14 where said memory means includes a non-volatile erasable memory coupled to said microprocessor means for storage of said accumulated totals therein.

16. The audit monitoring system as recited in claim 10 where said adapter means further includes means for monitoring displacement of an access door of the coin operated vending system having an output coupled to said interface means, said displacement monitoring means providing a signal to said interface means responsive to opening of the access door for transmission to said microprocessor to accumulate a number of door opening occurrences.

17. The audit monitoring system as recited in claim 10 where said power supply means includes an input coupled to a D.C. power source of the vending system.

18. The audit monitoring system as recited in claim 10 where said audit monitoring system further comprises a real time clock having an output coupled to said microprocessor for providing a time of day value.

19. The audit monitoring system as recited in claim 18 where said adapter means further includes means for monitoring displacement of an access door of the coin operated vending system having an output coupled to said interface means for providing a signal to said microprocessor means responsive to opening of the access door to accumulate a number of door opening occurrences and a respective time of day value therefore.

* * * * *